(12) United States Patent
Hayden et al.

(10) Patent No.: US 9,109,898 B2
(45) Date of Patent: Aug. 18, 2015

(54) LASER RADAR THROUGH THE WINDOW (LRTW) COORDINATE CORRECTION METHOD

(71) Applicants: Joseph Ethan Hayden, Ellicot City, MD (US); David Albert Kubalak, Wheaton, MD (US); Theodore John Hadjimichael, Washington, DC (US); Bente Hoffmann Eegholm, Columbia, MD (US); Raymond George Ohl, IV, Dayton, MD (US); Randal Crawford Telfer, Baltimore, MD (US); Phillip Coulter, Sewell, NJ (US)

(72) Inventors: Joseph Ethan Hayden, Ellicot City, MD (US); David Albert Kubalak, Wheaton, MD (US); Theodore John Hadjimichael, Washington, DC (US); Bente Hoffmann Eegholm, Columbia, MD (US); Raymond George Ohl, IV, Dayton, MD (US); Randal Crawford Telfer, Baltimore, MD (US); Phillip Coulter, Sewell, NJ (US)

(73) Assignee: Sigma Space Corporation, Lanham, MD (US)

( * ) Notice: Subject to any disclaimer, the term of this patent is extended or adjusted under 35 U.S.C. 154(b) by 186 days.

(21) Appl. No.: 13/945,260

(22) Filed: Jul. 18, 2013

(65) Prior Publication Data

US 2015/0092177 A1    Apr. 2, 2015

(51) Int. Cl.
*G01C 25/00* (2006.01)

(52) U.S. Cl.
CPC .................................. *G01C 25/00* (2013.01)

(58) Field of Classification Search
CPC .................. G01S 7/4802–7/487; G01S 17/89; G01S 7/497; G01C 3/08
USPC ......................................................... 356/5.01
See application file for complete search history.

(56) References Cited

U.S. PATENT DOCUMENTS

2010/0002222 A1* 1/2010 Lubard et al. ................ 356/4.01

* cited by examiner

*Primary Examiner* — Luke Ratcliffe
(74) *Attorney, Agent, or Firm* — Miodrag Cekie; Intellectual Property Strategists, L.L.C.

(57) ABSTRACT

A method for corrections of measurements of points of interests measured by beams of radiation propagating through stratified media including performance of ray-tracing of at least one ray lunched from a metrology instrument in a direction of an apparent point of interest, calculation a path length of the ray through stratified medium, and determination of coordinates of true position of the point interest using the at least one path length and the direction of propagation of the ray.

19 Claims, 7 Drawing Sheets

LASER RADAR THROUGH THE WINDOW (LRTW) COORDINATE CORRECTION METHOD

STATEMENT REGARDING FEDERALLY SPONSORED RESEARCH AND DEVELOPMENT

Parts of this invention were conceptualized developed and reduced to practice using US government funding under National NASA contract for MSES II/A project #07530 "JAMES WEBB SPACE TELESCOPE (JWST) INTEGRATED SCIENCE INSTRUMENTAL MODULE (ISTIM) METROLOGY". The US government has certain rights in this invention.

RELATED APPLICATIONS

The current application results from and claims priority benefit of U.S. Provisional Application Ser. No. 61/674,985, entitled "LASER RADAR THROUGH THE WINDOW (LRTW) COORDINATE CORRECTION METHOD", filed Jul. 24, 2012, which is herein incorporated by reference in its entirety.

FIELD OF THE INVENTION

The invention relates generally to methods for correction of physical effects imparted on a beam after it has been transmitted through different media (also referred to as environments or interfaces) to measure targets of interest. More particularly, the present invention pertains to measurements by propagation of radiation beams through stratified media (media that may be modeled via superposition of multiple layers of materials having substantially similar physical properties pertinent to individual layers while the physical properties my vary across the layer boundaries (e.g. when a beam of radiation crosses over the boundaries between the stratified layers). Even more particularly, several embodiments of the present invention pertain to optical measurements through transparent windows of vacuum chambers or vehicles (either manned or unmanned) such as consisting of satellites, rockets, missiles, atmospheric vehicles, exoatmospheric vehicles, aircrafts, spacecrafts, surface vehicles, underwater vehicles, combination vehicles (e.g. "amphibians"), and similar.

BACKGROUND OF THE INVENTION

It should be noted that, at least regarding the current invention, metrology instruments include measuring instruments arranged to determine coordinates or relative positions of predetermined points of interest using photonic beams and rays (visible, infrared, ultraviolet, x rays, gamma rays, microwaves, radio waves), particulate beams (including electron and positron beams, neutron beams, pion (charged and neutral) beams, meson (charged and neutral) beams, ion beams, atomic and polyatomic beams, molecule beams, and combinations including neutral and charged plasma beams and jets, and/or beams and streams of aggregated structures (including but not limited to, colloidal complexes, mono and poly crystals, nanotubes, fullerenes, glassy aggregates and combination structures).

Consequently, a particular subset of optical metrology instruments may include Laser Radars (LR), Laser Trackers (LT), optical directional and rangefinders, optical imagers and cameras, optical scanners, laser levels and plane finders, goniometers, theodolites, clinometers, tiltmeters, optical sights, optical markers and designators, and/or combination metrology instruments combining structures and functionalities of the listed instruments.

In particular embodiments, optical metrology instruments such as LR or LT may have measurement accuracies on the order of 0.025 mm over a 2 m measurement range when used in ambient conditions with no window between the measurement instrument and the target. When these same instruments are used to measure targets through a thick dielectric window without correcting for window effects measurement error will be on the order of the thickness of the single-pass glass path. Consequently, measurements made through a window, without applying the necessary corrections may result in suboptimal measurements.

In different classes of embodiments addressing situations where the metrology instrument and object to be measured may be separated by a stratified medium because of environmental, safety, contamination, or packaging requirements, etc. could potentially use the LRTW correction capability. One such example may consider accurate remote measurements and recordings of positions of parts (e.g. fuel roads) inside nuclear reactors trough windows, cooling fluids, and/ or moderating fluids.

Prior to the development of the LRTW coordinate correction method, correction of LRTW measurements have been performed generally using commercial ray trace methods and software usually augmented with custom scripts. Frequently, however, making through-the-window measurements with metrology instruments such as the LR or LT was avoided altogether.

Commercial ray trace methods and software packages may be costly and post-processing of the ray trace results may still be required. Also, calling commercial ray trace applications from a commercial metrology application, although possible, may involve additional overhead for importing/exporting the data and for running uncompiled scripts.

The LRTW correction software of the current invention may be integrated into commercial metrology software to allow targets measured through a window to be corrected in seconds to give the user real-time feedback. This LRTW correction software offers a complete solution for correcting all range and pointing errors associated with measuring targets through a window. Also, costly commercial ray trace software may not be required since this functionality may be an integral function of the LTRW software.

The LRTW coordinate correction method may also be used in a reverse mode to calculate apparent point of interest coordinates for known or corrected targets measured through a window. The apparent point of interest coordinates refers to the instrument reported coordinates when no window, vacuum, or SGR corrections have been applied. This capability may be useful for allowing the metrology instrument to locate targets measured through a window based on ambient blue print values to within 0.050 mm. Without this capability the time required to locate the targets manually could increase substantially as targets inside a vacuum chamber may not be well illuminated and may be difficult to locate, especially when viewing through the built-in LR or LT camera.

Some aspects and issues related to the subject matter of current invention have been addressed in the following non-patent publications, incorporated herein by reference:

T. Hadjimichael et. al. in "Cryogenic metrology for the James Webb Space Telescope Integrated Science Instrument Module alignment target fixtures using laser radar through a chamber window", Proc of SPIE Vol. 7793.

B. Eegholm, T. Hadjimichael, J. Hayden, R. Ohl, D. Kubalak, R. Telfer, "Laser Radar Through the Window (LRTW) Coordinate Correction Software", Sigma Space Invention Disclosure, filed Nov. 4, 2010.

SUMMARY OF THE INVENTION

Laser Radar measurements may be made through a vacuum chamber window for cryogenic metrology of targets attached to two different alignment fixtures used for the James Webb Space Telescope. The range and pointing errors imparted on the LR beam transmitted through up to four different environments resulted in reported LR distance errors of up to 22 mm, or roughly half the total single-pass glass path. These environments included: the air outside the chamber where the LR resides, the chamber window, the chamber environment, and the glass forming a solid glass retroreflector (SGR) target. The custom correction method and corresponding MATLAB® software have been developed to correct the measured laser-radar-through-the-window coordinates in post-processing. The software employs real ray tracing combined with a closed-form optical path length solution to resolve pointing and ranging errors caused by the phase- and group-refractive indices, respectively. The optical prescription used for ray tracing is established with knowledge of the environmental and physical parameters associated with each of the environments. The LRTW correction code shows agreement with independently developed FRED optical ray trace scripts to better than 1 µm average distance for identical environmental input parameters. The LRTW correction code was also verified by comparing LRTW corrected targets at ambient temperature and pressure on the JWST alignment fixtures to those same targets when measured with no window in place. The resulting average distance error was less than 30 µm (2-sigma), which is consistent with LR-related sources of measurement error for this test configuration. The LRTW coordinate correction software could also be used "in reverse" to calculate apparent point of interest locations for LR measurements made through a window given the blueprint or nominal values of those targets. This capability is useful for allowing the LR to quickly locate targets measured through a window or when setting up scan boundaries around poorly illuminated distant targets. Although the Laser Radar (LR) is referenced throughout this document, it is implicit that measurements made through a window by any time-of-flight or line-of-sight based optical metrology instrument could be corrected using the LRTW code.

The present invention is also directed to devices and assemblies arranged to perform a set of coordinate correction steps (or any individual step as required) and to perform error analysis and error assessment and management appropriate for different implementations of the method of current invention in various embodiments.

DETAILED DESCRIPTION

In the following description of embodiments of the present invention, numerous specific exemplary details are set forth in order to provide a more thorough understanding of the present invention. However, it will be apparent to one skilled in the art that the present invention may be practiced without one or more of these exemplary details. In other instances, well-known features of prior art have not been described in detail to avoid unnecessarily complicating the description.

One embodiment of the current invention utilizes a MATLABs code developed to model and correct for the refraction and range effects associated with making LR measurements through multiple optical media. Real ray tracing was used to model the refractive effects on the LR beam using known or calculated information about each of the media. In particular embodiments, a manually populated Excel spreadsheet was used to supply the LRTW correction software with the required optical, environmental, material, and dimensional parameters required to correct the apparent xyz-points measured by the LR. The LRTW correction software generates a unique optical prescription for each apparent point of interest to be corrected. The optical prescription, containing i=5 surfaces, is in the general form $Z_i$, $R_i$, $n_i$, and, $N_i$, where Z is the global position along the Z-axis at which the surface intersects the Z-axis, R is the radius of curvature, n is the phase refractive index, and $N_i$ is the unit normal directions of the SGR entrance face.

In this embodiment, a fixed-position LR mounted outside a vacuum chamber window was positioned with its nodal point at the origin of a coordinate system, called the Ray Trace Frame, whereby the Z-axis was defined to be normal to the air-side of the chamber window and the Y-axis is pointing in the gravity direction. The LR was roughly centered on the window so that it had a line-of-sight through the window to the targets inside the chamber. An LR beam with a wavelength of 1550 nm was transmitted through several different transparent optical media while measuring multiple targets inside the chamber. The transparent optical media included (but have not been limited to): 1) the ambient air around the LR outside the chamber, 2) the chamber window, and 3) the ambient or cryogenic vacuum chamber environment. It may be useful to consider additional (e.g. fourth) optical media, for example in cases where the point of interest may include the apex of a solid glass retroreflector (SGR) made of N-BK7. Real ray tracing may be used to trace a ray from the LR nodal point through each of the optical media to the true point of interest position $V_T$.

Figure 1:
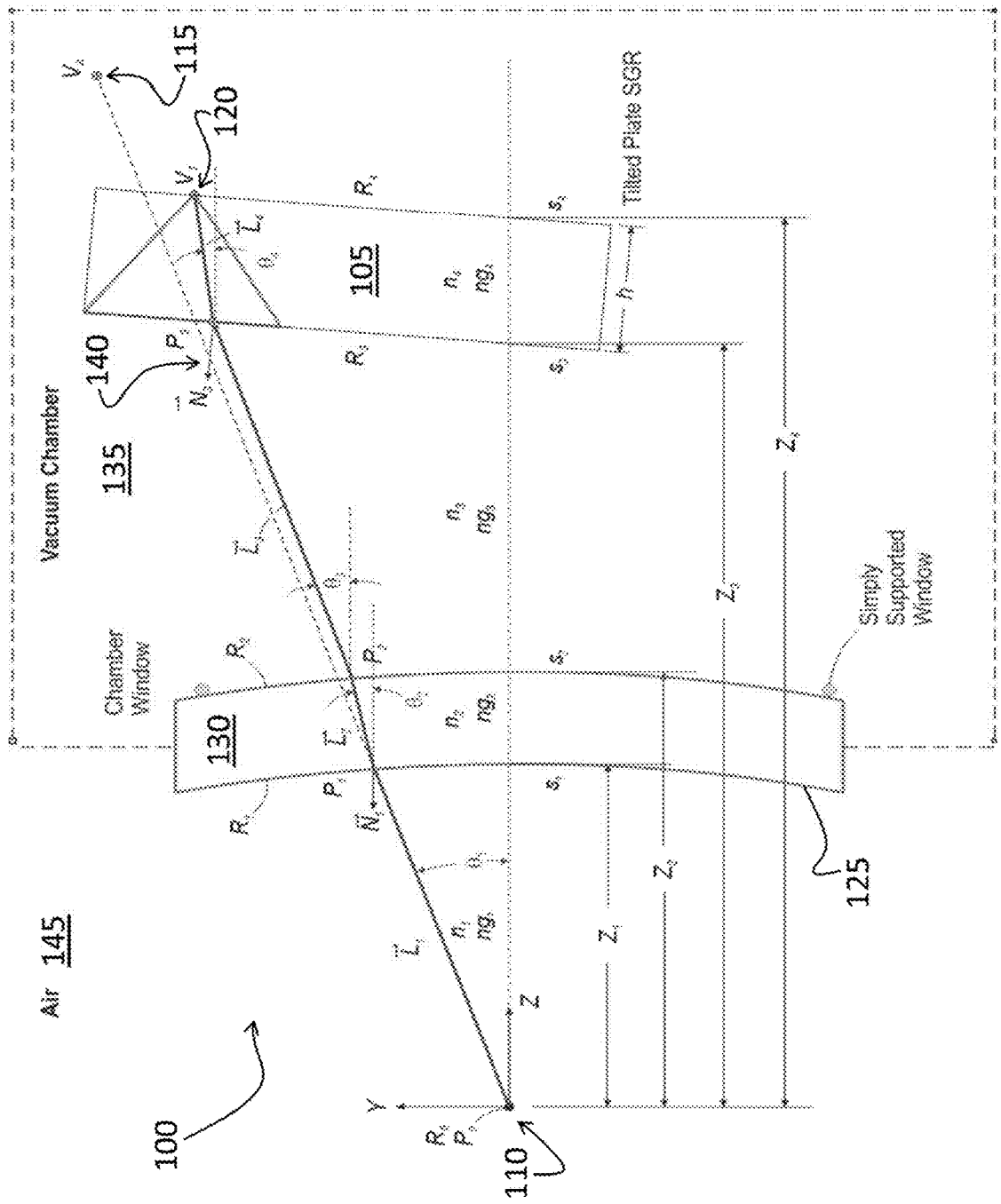
FIG. 1 is a schematic of a test configuration for measuring the LR point of interest inside a vacuum chamber with the LR in accordance with one embodiment of current invention.

An exemplary ray trace configuration 100 is shown in FIG. 1. For completeness, the SGR 105 is shown in this ray trace configuration 100; however, if the point of interest is not an SGR 105 then the SGR 105 thickness may be set to h=0 so that $V_T=P_3$.

The custom MATLAB® code [MATLAB® 64-bit version 8.1.0.604 (R2013a) by MathWorks®] of this embodiment uses well established vector-based refractive ray tracing methods [e.g. Foley, J. D., and Van Dam, A. "Computer Graphics: Principles and Practice, Second Edition" Addison-Wesley New York, N.Y. 1990.]; Glassner, A. (ed) "An Introduction to Ray Tracing" Academic Press New York, N.Y. (1989)] to launch rays from the LR through a simple optical system. The ray trace may be initiated by calculating the direction of the ray exiting the nodal point 110 as $\hat{L}_1 = \overline{P_0 V_A}/|\overline{P_0 V_A}|$ where the LR nodal point 110 is $P_0=<0, 0, 0>$ and the apparent point of interest 115 in the Ray Trace Frame is $V_A=<V_{Ax}, V_{Ay}, V_{Az}>$. The apparent point of interest 115 position may be the position of the point of interest as measured and reported by the LR when the refraction and range effects associated with beam propagation through multiple optical media are not considered.

The true point of interest 120 position, $V_T$, cannot be resolved with ray tracing alone. However, by temporarily setting $Z_3=V_{Az}$, it is possible to resolve $\vec{L}_1, \vec{L}_2, \hat{L}_3$, and $\vec{L}_4$. Note that only the direction of $\vec{L}_3$ is known so $V_T$ cannot be determined until La is calculated with knowledge of the corrected range.

Figure 2:
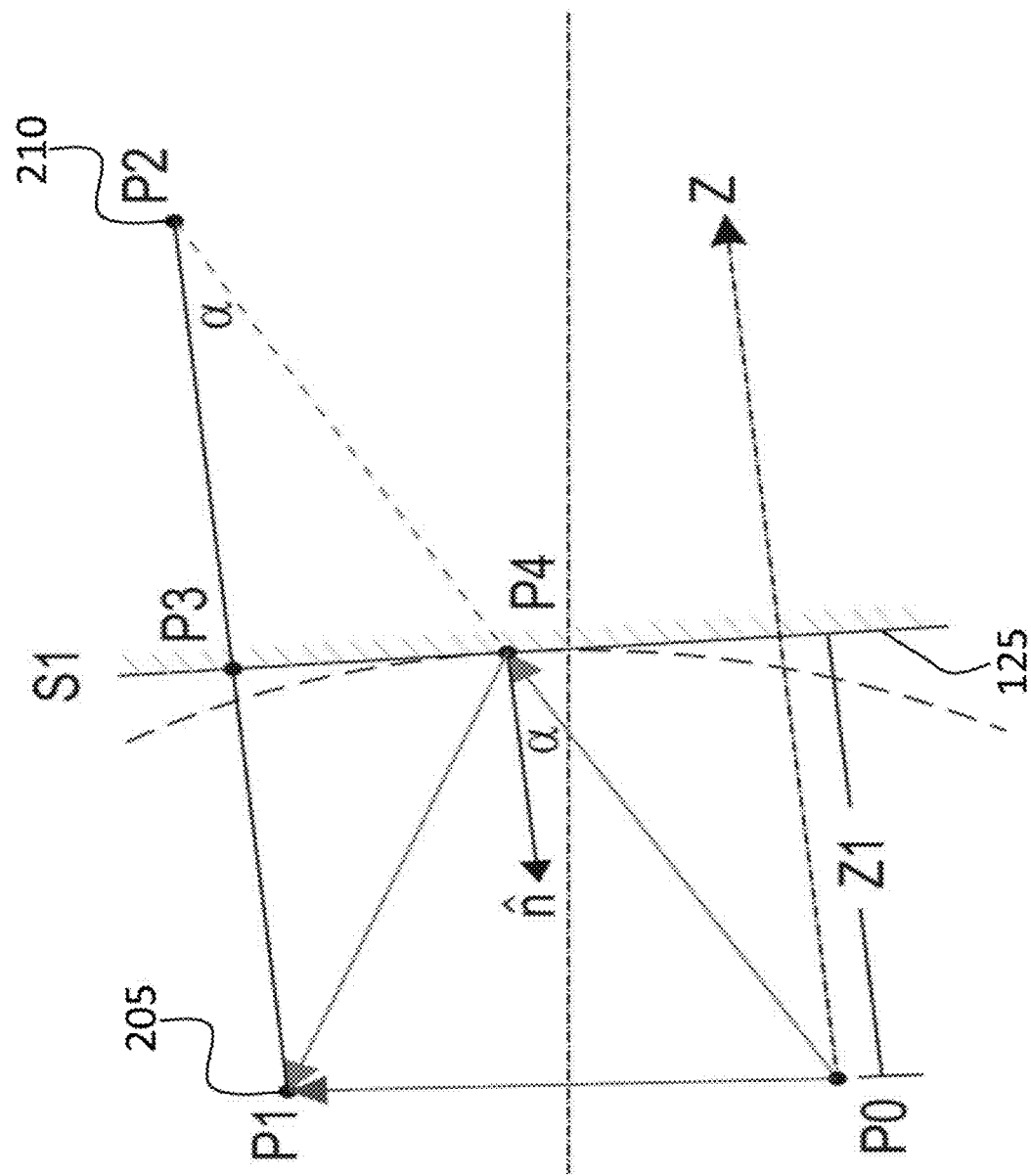
FIG. 2 is a schematic of the direct & through measurements used on the first surface of the uncoated chamber window to establish the position and normal of the window for the ray trace, where the LR, at P0, measures a real tooling ball at P1 and measures the virtual TB at point P2.

The distance $Z_1$ between the LR, located at P0, to the first surface of the window 125, S1, can be determined using direct and through measurements [Spatial Analyzer Users Manual, New River Kinematics, Williamsburg, v. 1.21.2008, page 150,] FIG. 2, on a single tooling ball (TB) 205, placed at P1, and its refection 210 defined by the virtual point P2. The TB 205 position, although somewhat arbitrary, must satisfy the minimum LR to TB distance on the order of 1 m and the LR must have lines of sight to both P1 and P2. The measurement of the virtual TB reflection 210 position at P2 requires that the signal detection parameters in the LR control software be modified to accept a low reflectance target. The low reflectivity from P2 results from the LR beam double-passing the uncoated 4% reflective window. The window surface 125, S1, is normal to the Z axis by definition of the ray trace frame.

The unit vector, n̂, describing the normal of the first surface 125, S1, of the window is $$\hat{n} = \frac{P1 - P2}{|P1 - P2|}, \quad (1)$$

where P1 and P2 are the real and virtual tooling ball (TB) points, respectively, measured by the LR.

The vacuum chamber window 130 will undergo an axial deflection as a function of differential pressure that imparts a meniscus shape on the window 130, FIG. 1, where the radius of curvature, R, for either side of the window is described by Hearn [D. Hearn, "Vacuum window optical power induced by temperature gradients", SPIE Vol. 3750, July (1999)] as $$R=(4\in h^3)/[3(1-v)(3+v)a^2 \Delta p] \quad (2)$$

where $\in$, is the elastic modulus, h is the window thickness, v is Poisson's Ratio, a is the radius of the simply supported window, and $\Delta p$ is the pressure differential on the window 130. In one embodiment, a 25.502 mm thick Fused Silica window 130 used in a vacuum chamber 135 may result in approximately 400 m radius of curvature for a differential window pressure of $\Delta p=10^{-5}$ mm of Hg. The radius of curvature of the window 130 may be calculated, using equation (2), for each apparent point measured by the LR based on the differential pressure on the window 130 at the time of the measurement.

In the exemplary embodiment of FIG. 1, using a tilted plane-parallel plate model of the SGR 105, may be used by requiring that all rays entering the SGR 105 end at the apex, or mechanical vertex, of the SGR 105. Some motivation for such constraint may be found by considering that the SGR 105 apex may be intrinsically identified when measured with a laser tracker LT, which automatically locks-on to the SGR 105 apex. Consequently, only the chief ray of the LT beam entering the SGR 105 needs to be raytraced. In the case of the LR, identification of the SGR 105 apex may be complicated by the need to use post-processing to establish the apex from the SGR 105 facet intersections. Surface normal 140 of the SGR entrance face may be determined from separate independent measurements on the adjacent co-planer mount surface of the SGR 105 that are assumed to be the same at ambient and cryogenic temperature. The mechanical vertex may be used as the reference for the SGR 105, rather than the SGR 105 nodal point, to facilitate comparisons with direct back-side measurements of the SGR 105 mechanical vertex from the 3-plane intersection of the facets.

Figure 3:
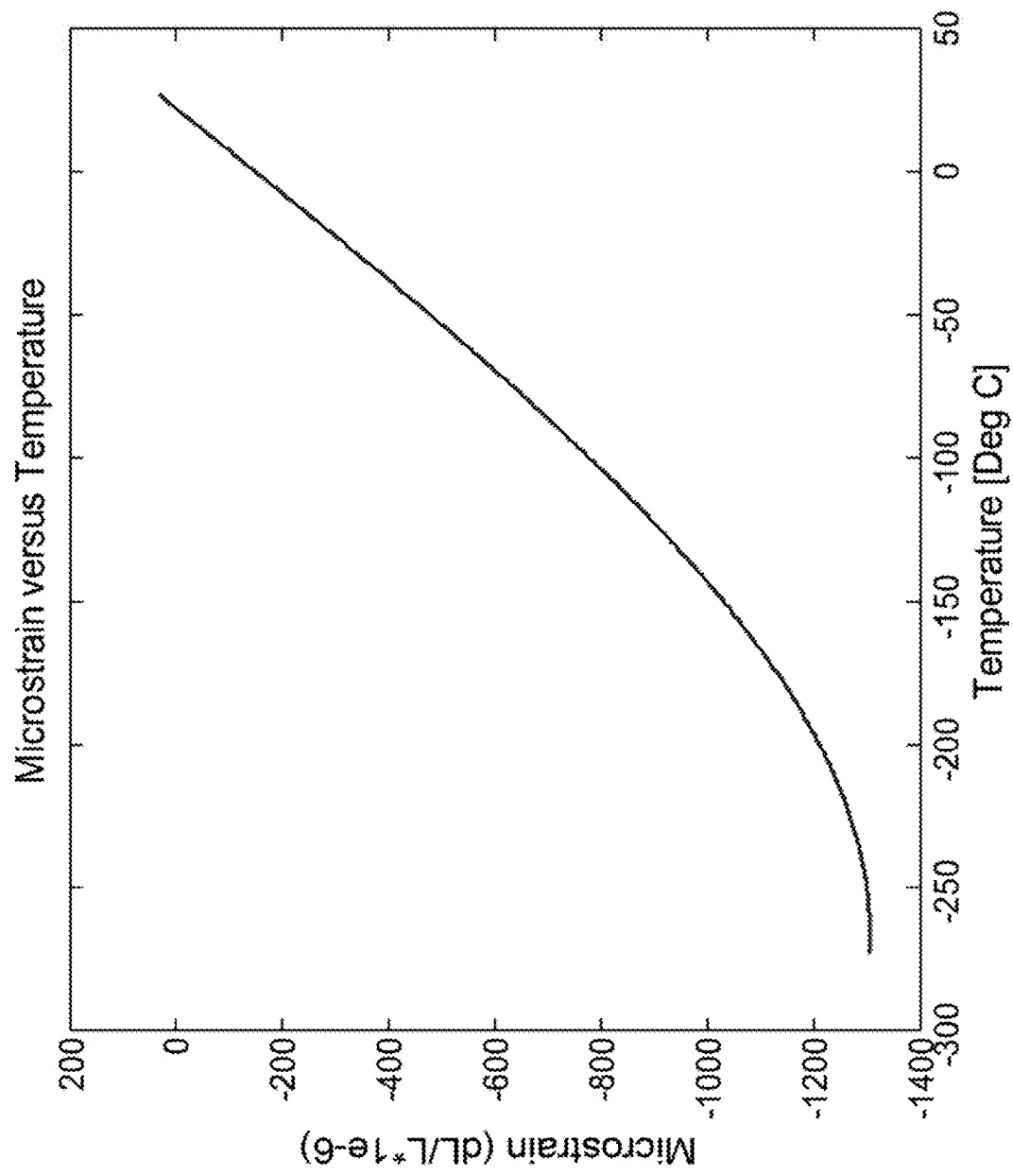
FIG. 3 is a plot of microstrain versus temperature for Schott N-BK7 glass determined from average of ESA data (Excel file name "BK7 at PMIC low temp.xls", ESA contract 1358, from testing on 6 Nov. 2009 and 10 Nov. 2009).

A thickness versus temperature correction can be also applied to the SGRs using empirical data from the European Space Agency (ESA) where microstrain was defined as a function of temperature, FIG. 3, using the polynomial $$\frac{\Delta l}{l} = 10^{-6} \sum_{i=0}^{3} P_i T^i \quad (3)$$

where $P_0=-148.53$, $P_1=6.7335333$, $P_2=0.0014505$, and $P_3=-2.8215e-005$. Using this calculation our 19 mm thick N-BK7 SGRs change thickness by −24 μm as the temperature changes from 20 C to −238 C for an initial thickness of 19 mm at 20° C.

High-accuracy time-of-flight instrumentation such as the LR and LT may use Edlen's equation [K. P. Birch and M. J. Downs, "An updated Edlén equation for the refractive index of air", Metrologia 30, 155-162 (1993) K. P. Birch and M. J. Downs, "An updated Edlén equation for the refractive index of air," Metrologia 30, 155-162 (1993); K. P. Birch and M. J. Downs, "Correction to the updated Edlén equation for the refractive index of air", Metrologia 31, 315-316 (1994); G. Bonsch and E. Potulski, "Measurement of the refractive index of air and comparison with modified Edlén's formulae", Metrologia 35, 133-139 (1998)], to calculate the absolute phase refractive index of air as a function of the air pressure, temperature, and relative humidity. The LR may be equipped with an external environmental sensor that provides pressure, temperature, and relative humidity input to the Edlen's equation for all measurements made by the LR. However, in the case where the vacuum chamber 135 contains air which is separated from the air 145 outside the chamber, a separate phase refractive index may be calculated using Edlen's equation using input from the appropriate sensors placed inside the air-filled vacuum chamber. The phase refractive index may be used with the real ray tracing to model refractive effects at the interfaces.

The absolute phase refractive index of the glass window 130 and the glass SGR 105 may be described by the temperature- and wavelength-dependent modified Sellmeier dispersion equation [D. Leviton, B. Frey, "Temperature-dependent absolute refractive index measurements of synthetic fused silica", Proc of SPIE Vol. 6273; D. Leviton, B. J. Frey, "Cryogenic, High-Accuracy, Refraction Measuring System (CHARMS)—a new facility for cryogenic infrared through far-ultraviolet refractive index measurements", SPIE, Glasgow, June, 2004], using $$n(\lambda, T) = \sqrt{1 + \sum_{i=1}^{3} \frac{S_i(T) \cdot \lambda^2}{\lambda^2 - \lambda_i^2(T)}} \quad (4)$$

where $$S_i(T) = \sum_{j=0}^{4} S_{ij} \cdot T^j, \quad (5)$$

and $$\lambda_i(T) = \sum_{j=0}^{4} \lambda_{ij} \cdot T^j. \quad (6)$$

Determination of the true point of interest 120 position, $V_T$ in FIG. 1, from the LR-measured apparent point of interest 115 position, $V_A$, requires that real ray tracing be combined with a closed-form range correction equation. The range correction equation uses the results of the real ray trace, namely $\vec{L}_1$, $\vec{L}_2$, $\hat{L}_3$, and $\vec{L}_4$, combined with the calculated group refractive indices for each optical media, to solve for the true point of interest position.

When a pulse of light from either an LR or LT is propagated through a dispersive media the modulation envelope advances at a velocity that is different from the phase velocity of the waveform. Consequently, the group refractive index ["Optics—4$^{th}$ Edition", Eugene Hecht, p 296, Ch 7.2.2 Group Velocity"] may be used when modeling the range effects. Both the phase- and group-index of light propagating through a dispersive medium have a wavelength and temperature dependence. For a homogeneous dispersive media the group index $n_g$ is related to the phase index n, by $$n_g = n + k \frac{dn}{dk} \quad (7)$$

where $$k = 1/\lambda.$$

The group index for the air may be calculated using a closed-form solution for dn/dk, from Edlen's equation, to model range effects. The group refractive indices for the Corning Fused Silica 7980 chamber window and the N-BK7 SGR are calculated from the derivative of the phase refractive index in equation (4) to get $$\frac{dn}{dk} = \frac{k}{n} \sum_{j=1}^{3} \frac{S_j \lambda_j}{(1 - \lambda_j k^2)^2}. \quad (8)$$

Figure 4:
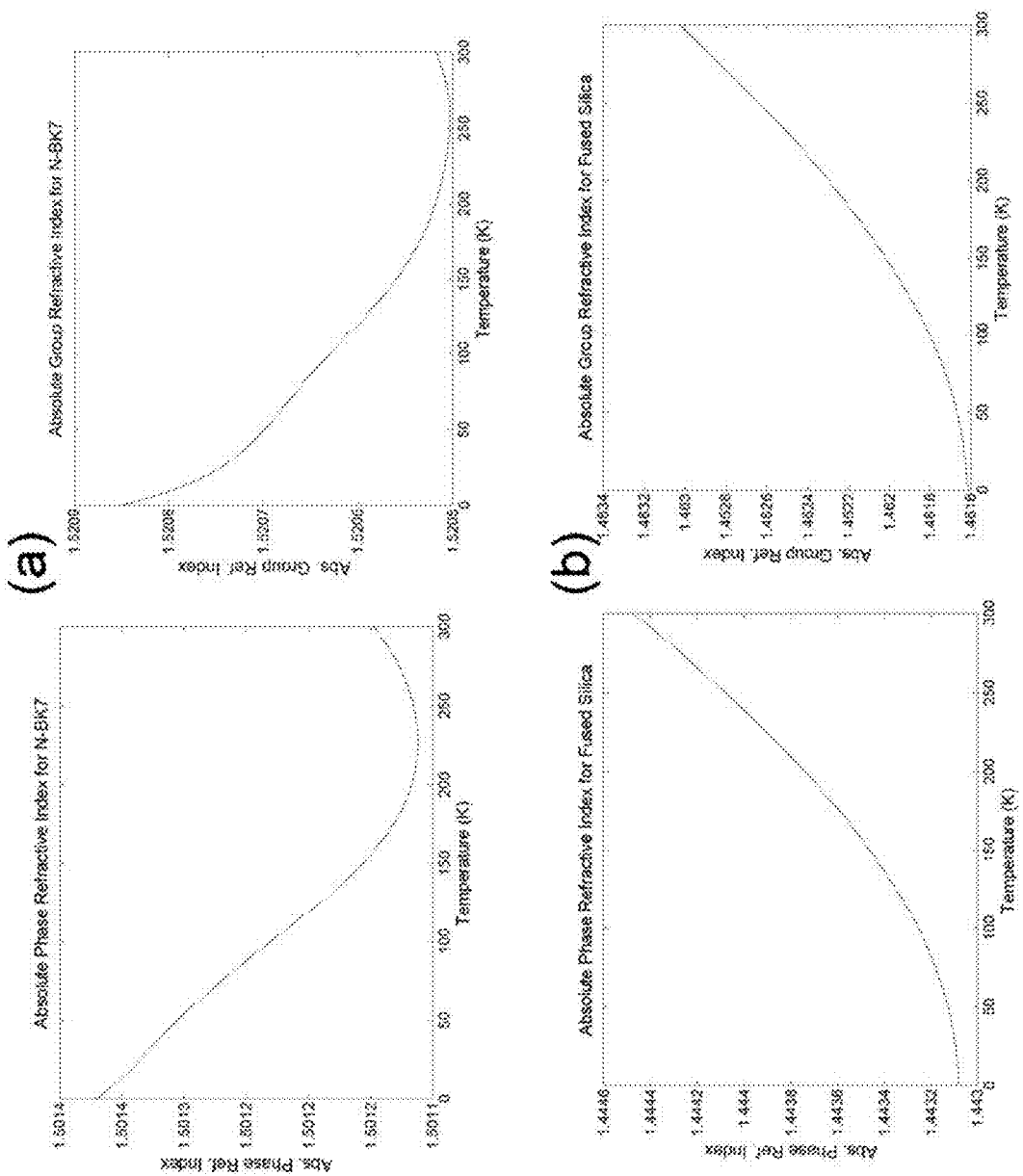
FIG. 4 is an example of plots of absolute phase and group refractive indices versus temperature for a) N-BK7, and for b) Corning Fused Silica 7980, generated using the wavelength- and temperature-dependent Sellmeier equation with corresponding CHARMS coefficients.

The absolute phase refractive index, n, and absolute group refractive index, $n_g$, FIG. 4, of the Corning Fused Silica 7980 chamber window and the N-BK7 SGR are calculated using equations (4)-(8) at the fixed LR wavelength of 1550 nm. equations (4), (5), (6), and (8) are based on the modified Sellmeier equation and the CHARMS coefficients in Table 1 (a).

TABLE 1

Coefficients for the temperature-dependent Sellmeier fit of the refractive index of: a) Corning Fused Silica 7980, valid for 30 K < T < 300 K, and 0.4 μm < λ < 2.6 μm, and b) N-BK7, valid for 50 K < T < 300 K, and 0.45 μm < λ < 2.7 μm.

| Term | S1 | S2 | S3 | L1 | L2 | L3 |
|---|---|---|---|---|---|---|
| (a) CHARMS coefficients for Corning Fused Silica 7980 glass | | | | | | |
| $T^0$ | 1.10127E+00 | 1.78752E−05 | 7.93552E−01 | 8.90600E−02 | 2.97562E−01 | 9.34454E+00 |
| $T^1$ | −4.94251E−05 | 4.76391E−05 | −1.27815E−03 | 9.08730E−06 | −8.59578E−04 | −7.09788E−03 |
| $T^2$ | 5.27414E−07 | −4.49019E−07 | 1.84595E−05 | −6.53638E−08 | 6.59069E−06 | 1.01968E−04 |
| $T^3$ | −1.59700E−09 | 1.44546E−09 | −9.20275E−08 | 7.77072E−11 | −1.09482E−08 | −5.07660E−07 |
| $T^4$ | 1.75949E−12 | −1.57223E−12 | 1.48829E−10 | 6.84605E−14 | 7.85145E−13 | 8.21348E−10 |
| (b) CHARMS coefficients for N-BK7 (or BK7) glass | | | | | | |
| $T^0$ | 1.07036E+00 | 2.02896E−01 | 8.50659E−01 | 8.20884E−02 | 1.41222E−01 | 9.38638E+00 |
| $T^1$ | 1.75658E−03 | −1.75289E−03 | 1.03233E−03 | 4.35600E−05 | −5.41379E−05 | 5.24515E−03 |
| $T^2$ | −4.28401E−06 | 4.19934E−06 | −6.88935E−06 | 5.85421E−08 | 4.72890E−06 | −3.54202E−05 |
| $T^3$ | −1.65687E−11 | 4.52824E−10 | 2.56510E−08 | −4.13612E−10 | −2.73546E−08 | 1.32249E−07 |
| $T^4$ | 7.55467E−12 | −8.18792E−12 | −4.71564E−11 | 5.61059E−13 | 8.01380E−11 | −2.38407E−10 |

The true total geometric path length of the LR beam as it travels from $P_0$ to $V_T$ through four optical media is $$L_T = L_1 + L_2 + L_3 + L_4 \quad (9)$$

where $L_i$, for i=1, 2, 3, 4, is the geometric length of the ray in each of the optical media. The optical path length measured by the LR is $$L_A ng_1 = L_1 ng_1 + L_2 ng_2 + L_3 ng_3 + L_4 ng_4, \quad (10)$$

where $L_A$ is the apparent total geometric length of the LR beam, and $ng_i$, for i=1, 2, 3, 4 is the group index of each of the optical media. Solving for $L_3$ gives the closed-form range equation $$L_3 = \frac{(L_A ng_1 - L_1 ng_1 - L_2 ng_2 - L_4 ng_4)}{ng_3}. \quad (11)$$

Finally, using equation (11) with the values $\vec{L}_1$, $\vec{L}_2$, $\hat{L}_3$, and $\vec{L}_4$ determined from the ray trace, and using the calculated group refractive indices for each of the optical media, the true point of interest coordinates ($V_T x$, $V_T y$, $V_T z$) can be resolved by vector addition of the rays in each of the optical media as $$V_T = \vec{L}_1 + \vec{L}_2 + \hat{L}_3 L_3 + \vec{L}_4 . \quad (12)$$

Figure 5:
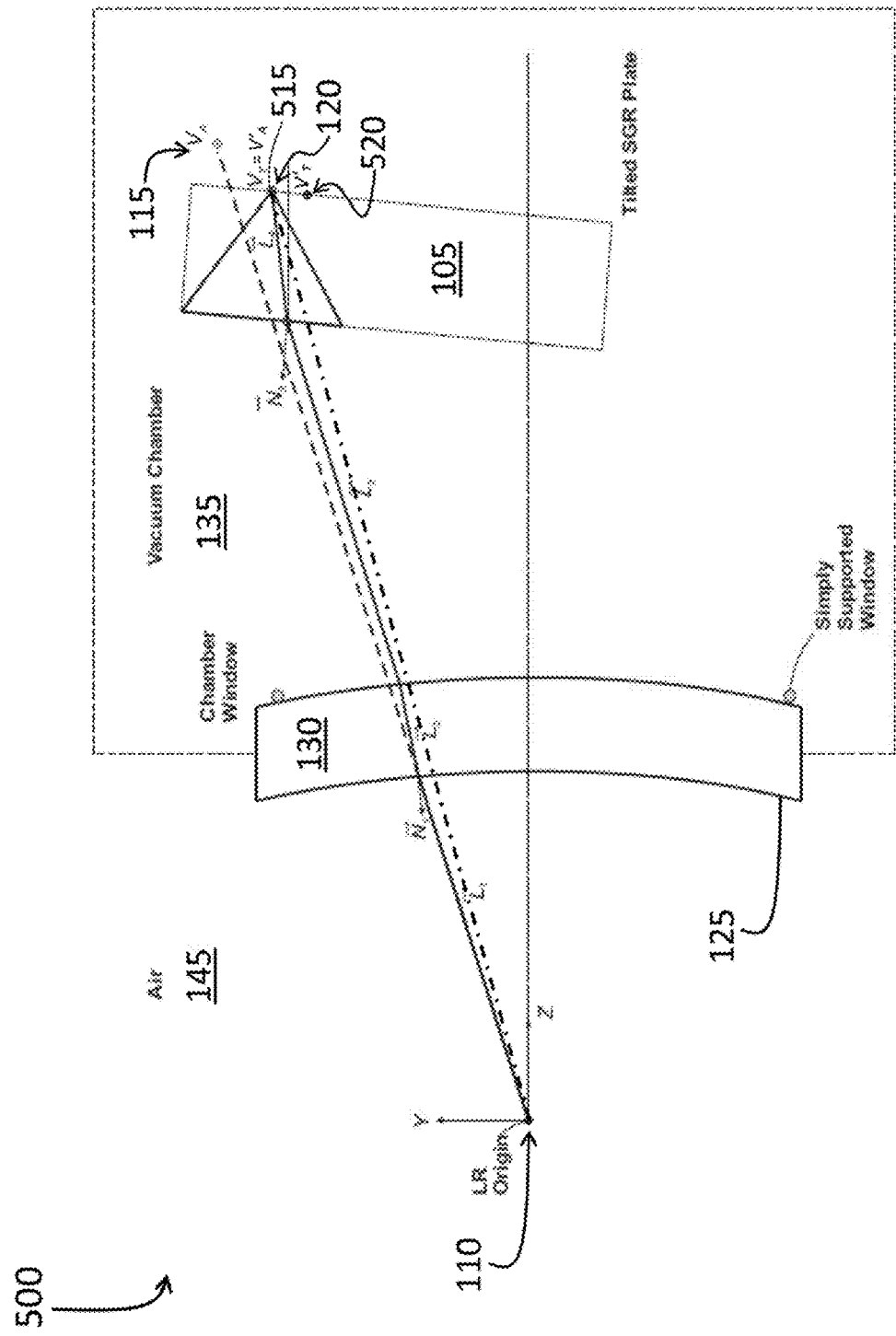
FIG. 5 is a schematic of a test configuration for LR measurements in accordance with another embodiment of current invention.

Some additional functionalities of different embodiments of the current invention include calculation of apparent point of interest 115, $V_A$, given the true or nominal point of interest positions 120, $V_T$ (having known coordinates ($V_T X$, $V_T y$, $V_T z$)). This capability, FIG. 5, may be useful for allowing the LR to efficiently locate measured through a stratified optical medium (e.g. window 130) or when setting up scan boundaries around poorly illuminated distant targets. Occasionally, it may be also helpful to convert LR measurements made on metrology targets in a lab to their corresponding values in a particular vacuum chamber environment when measured through a window.

The apparent point of interest 115 position, $V_A$, can be calculated by using the LRTW code in an optimization loop to minimize the merit function $$f = |V_T - V_T'|. \quad (13)$$

where $V_T'$ is the current calculated point of interest 520 position using guess $V_A'$ for the apparent point of interest 515 position, or $V_T' = LRTW(V_A')$. The optimization loop modifies the apparent point of interest 515 position $V_A'$ until the merit function has been optimized (e.g. until $f_{min} > |V_T - V_T'|$, wherein the $f_{min}$ represents a predetermined optimization parameter corresponding to the desired accuracy). The optimization may be initialized with $V_A' = V_T$ as $V_T$ may be sufficiently close to $V_A$ to allow rapid convergence.

Figure 6:
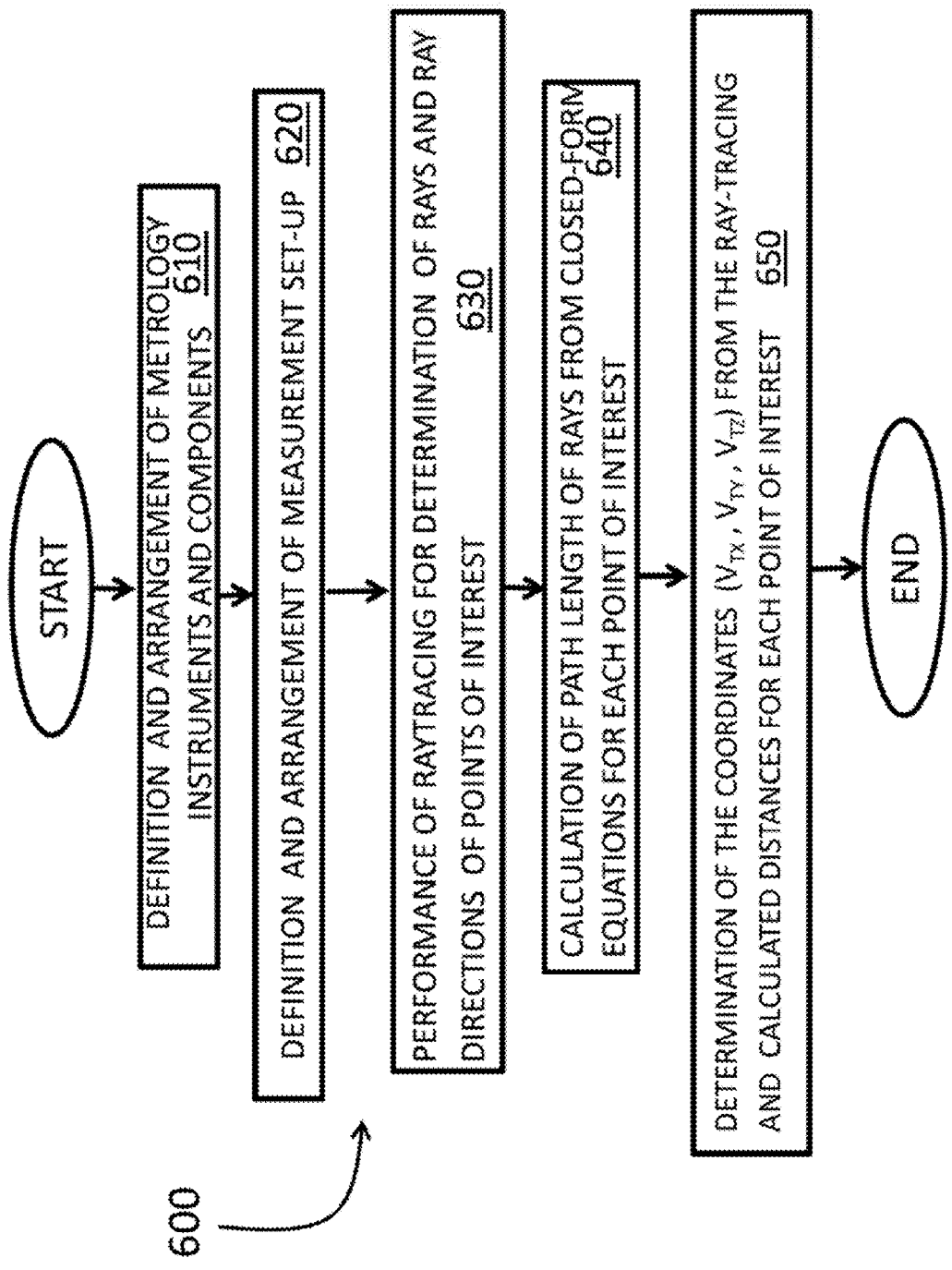
FIG. 6 is a schematic of a test configuration for LR measurements in accordance with another embodiment of current invention.
Figure 7:
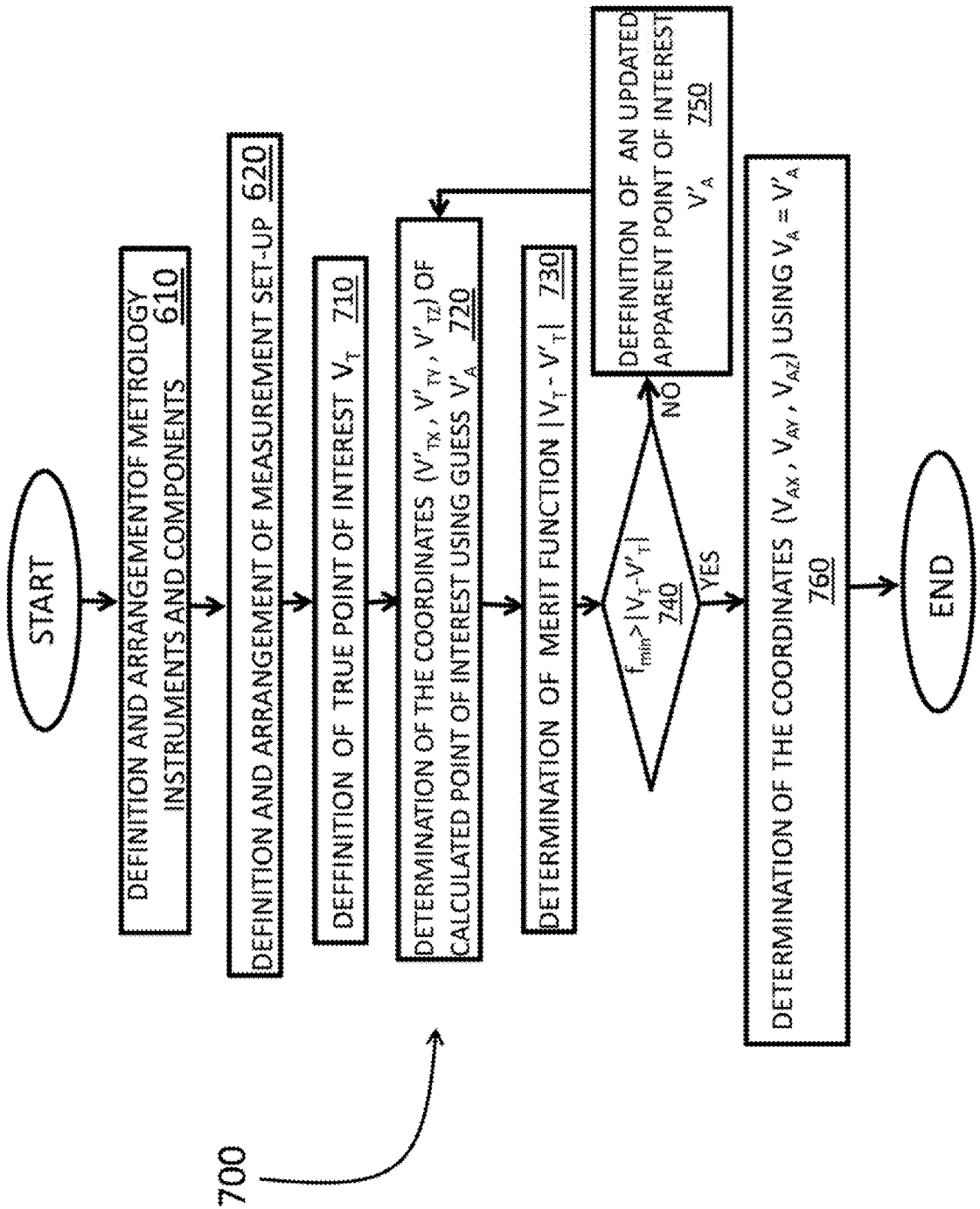
FIG. 7 is a schematic of a test configuration for LR measurements in accordance with another embodiment of current invention.

The above methods for determination of the true point of interest 120 position, (as illustrated, for example, in FIG. 1.) and determination of the apparent point of interest 115 position, $V_A$, (as illustrated for example, in FIG. 5.) may be schematically represented in flowcharts 600 and 700 forms in respective FIGS. 6 and 7. Regarding the flowchart 600 representing the exemplary embodiment of the method for determination of the true point of interest 120 position, initial steps of determination of components and physical parameters 610 and definition of the set-up geometry 620 may be initially performed during the conceptualization and set-up phases. One should note that steps 610 and 620, depending on particulars of different embodiments may be performed in sequence (in direct or reversed order) or iteratively (e.g. on the component by component basis) during the conceptualization and definition of the model constituencies and geometry. It should be also evident to practitioners (at least from disclosures above) that increasingly detailed description of the optical and special relationships of the relevant parameters (e.g. detailed geometry and properties of the chamber window 130 and surface 125 under various pressures and temperatures) may be introduced and/or subsequently refined without exceeding the scope and limitations of the current invention.

Regarding the performance of the ray-tracing step 630, one may note that, depending upon particular embodiment, dedicated ray-tracing routines may be utilized, combining commercially available and/or custom developed programs and/or program modules.

Regarding the determination of coordinates steps 650 of various embodiments, one may note that the disclosed method may be repeated in its entirety or in parts (e.g. steps 630-650) such that a plurality of points of interests may be obtained and used for generation of images and 3D object positions, for example for imaging, images corrections, 3D orientation, guidance, position and motion control, mapping, reconnaissance, and other embodiment-dependent usages.

Regarding the embodiments of the method for determination of the (unknown) apparent point of interest 115 position, $V_A$, corresponding to the (given, known or previously determined for example as in step 710) true point of interest 120 position, $V_T$; as schematically represented in the flowchart in FIG. 7, it may be noted that the embodiment-specific steps 610 and 620 may not differ substantially for the analogues steps as represented in FIG. 6.

Regarding the step 720 of determination of the current iteration calculated point of interest 520 position $V_T'$ it may be noted that the aforementioned initial choice of iteration starting point $V_A' = V_T$ of the current calculated point of interest 520 position $V_T'$ may be convenient in some embodiments, at least in part, because of the reasonable expectation of proximity of $V_A$ and $V_T$. In different embodiments, the iterative process represented by the flowchart 700 may be initiated by a semi-arbitrary or other convenient guess for the apparent point of interest 515 position $V_A'$. Correspondingly, the step 750 of definition on new updated choice of apparent point of interest $V_A'$ may be conducted using various embodiment-specific methodologies generally motivated by the practitioners' interest to accelerate and improve the iteration process (e.g. to efficiently and reliably satisfy the convergence criterion exemplified by the interrogation block 740).

Also, the step 760 of determination of the apparent point of interest 115 position from the convergence of the iterative process may be followed by subsequent repetitions of the step 710 for an additional (e.g. proximal) point of interest 515 such that subsequent iterative procedures may be executed for a plurality of additional points of interest 515.

Targets such as pinholes, thru-holes, and SGRs used on JWST alignment fixtures could be successfully measured through a window and corrected for range and pointing errors. The LRTW correction code was verified by comparing the LRTW corrected targets on the JWST alignment fixture targets with the same targets measured with no window in place. The resulting average distance error was less than 30 μm (2-sigma), which is consistent with LR-related sources of measurement error for this test configuration. The LRTW correction code showed agreement with independently developed FRED optical ray trace scripts to less than 1 μm average distance for identical environmental input parameters. The LRTW coordinate correction software can also be used "in reverse" to calculate apparent point of interest locations for LR measurements made through a window given the blueprint or nominal values of those targets. The LRTW correction capability has been reduced to practice using both laser radar and laser tracker measurement devices. Although the LRTW correction was initially developed to correct for laser radar and laser tracker measurements made through a window, this correction technology could be applied to any metrology device that uses pointing and/or ranging to measure the position of a metrology point of interest through a window.

The present invention has been described with references to the above exemplary embodiments. While specific values, relationships, materials and steps have been set forth for purpose of describing concepts of the invention, it may be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

The scope of the LRTW capability is not limited to optical metrology measurements on telescope optics or hardware made through a chamber window. Further improvements could be made to the implementation of LRTW corrections by employing multiple metrology devices used through a window in a unified spatial metrology network (USMN) to reduce measurement errors.

We claim:

1. A method for corrections of metrology instruments measurements of positions of points of interest measured by beams of radiation propagating through stratified media comprising following steps:
  a) definition and arrangement of at least one metrology instrument, definition of at least one point of interest, and at least one stratified medium;
  b) definition and arrangement of at least one measurement setup having the at least one metrology instrument, at least one point of interest, ad at least one stratified medium having a least a portion of stratified medium arranged in between and separating the at least one metrology instrument and the at least one point of interest;
  c) performance of ray-tracing of at least one ray lunched from that at least one metrology instrument in a direction of an apparent position of the at least one point of interest through at least the portion of the at least one stratified medium and determination of at least one direction of propagation of the at least one ray through the at least the portion of the at least one stratified medium arranged in between and separating the at least one metrology instrument and the at least one point of interest, and measurement of at least one apparent total geometric length from the at least one metrology instrument to the apparent position of the at least one point of interest along the at least one ray;
  d) calculation of at least one path length of the at least one ray through the at least a portion of the at least one stratified medium using optical properties of the at least one stratified medium, the at least one direction of propagation of the at least one ray, and the at least one apparent total geometric length from the at least one metrology instrument to the apparent position of the at least one point of interest along the at least one ray; and
  e) determination of coordinates of true position of the at least one point interest using the at least one path length and the at least one direction of propagation of the at least one ray.

2. The method for corrections of metrology instruments measurements of positions of points of interests of claim. 1, wherein the at least one metrology instrument has been arranged to radiate a beam of radiation through the at least a portion of the: at least one stratified medium.

3. The method for corrections of metrology instruments measurements of positions of points of interests of claim 2, wherein the at least one metrology instrument has been arranged to radiate a beam of radiation chosen from a set of beams consisting of visible photon beams, infrared, photon beams ultraviolet photon beams, x-ray photon beams, gamma ray photon beams, microwave. photon beams, radio waves photon beams, particulate beams, electron. beams, positron beams, pion beams, meson beams, proton neutron beams, alpha particle beams, ion beams, atom beams, polyatomic beams, molecule beams, neutral and changed plasma beams, colloidal complexes beams, mono and poly crystals beams, nanotubes beams, fullerenes beams, glassy aggregates beams and combinations of listed beams.

4. The method for corrections of metrology instruments measurements or positions of points of interests of claim 1, wherein the at least one metrology instrument is an optical metrology instrument chosen from the set of optical metrology instruments consisting of laser radars, laser trackers, optical rangefinders, optical imagers and cameras, optical scanners, laser levels and plane finders, goniometers, theodolites, clinometers, tiltmeters, optical sights, optical markers and designators, and combination metrology instruments combining structures and functionalities of the listed optical metrology instruments.

5. The method for corrections of metrology instruments measurement of positions of points of interests of claim 1, wherein the at least one stratified medium is a dielectric window.

6. The method for corrections of metrology instruments measurements of positions of points of interests of claim 5, wherein the dielectric window have been arranged on a vacuum chamber.

7. The method for corrections of metrology instruments measurements of positions of points of interests of claim 5, wherein. the dielectric window have been arranged on a vehicle.

8. The method for corrections of metrology instruments measurements of positions of points of interests of claim 7, wherein the vehicle is chosen from a set of vehicles consisting of satellites, rockets, missiles, atmospheric vehicles, exoatmospherio vehicles, aircrafts, spacecrafts, surface vehicles, underwater vehicles, and combinations.

9. The method for corrections of metrology instruments measurements of positions of point of interests of claim 1, wherein the at least one stratified medium includes at least one solid glass retroreflector (SGR) target.

10. The method for corrections of metrology instruments measurements of positions of points of interests of claim 9, wherein the at least one glass retroreflector (SGR) target has been arranged in proximity to the at least one point of interest.

11. The method for corrections of metrology instruments measurements of positions of points of interests of claim 1 wherein after the step e) of determination of coordinates of true position of the at least one point of interest, the steps c)-e) are repeated in succession for determination of coordinates of true position of the at least one point of interest.

12. A method for corrections of metrology instruments measurements of positions of points of interests measured by beams of radiation propagating through stratified media comprising following steps:
  a) definition and arrangement of at least one metrology instrument, definition of at least one point of interest, and at least one stratified medium;

b) definition and arrangement of at least one measurement setup having the at least one metrology instrument, at least one point of interest, and at least one stratified medium having at least a portion of stratified medium arranged in between and separating the at least one metrology instrument and the at least one point of interest;

c) determination of coordinate of a true point of interest position of the at least one point of interest;

d) performance of ray-tracing of at least one ray lunched from that at least, one metrology instrument in a direction of a choice point of interest position through at least the portion of the at least one stratified medium and determination of at least one direction of propagation of the at least one ray through the at least the portion of the at least one stratified medium arranged in between and separating the at least one metrology instrument and the at least one point of interest, and measurement of at least one apparent total geometric length from the at least one metrology instrument to the apparent position of the at least one point of interest along the last one ray;

e) calculation of at least one path length of the at least one ray through the at least a portion of the at least one stratified medium using optical properties of the at least one stratified medium, the at least one direction of propagation of the at least one ray, and the at least one apparent total geometric length from the at least one metrology instrument to the apparent position of the at least one point of interest along the at least one ray;

f) determination of coordinates of a current calculated point of interest position using the at least one path length and the at least one direction of propagation of the at least one ray;

g) determination of at least one merit function value by comparing separation of the current calculated point of interest position and the true point of interest position, h) coordinate of the at least one merit function value at least one predetermined optimization parameter if the at lean one predetermined optimization parameter substantially exceeds the at least one merit function value the coordinates of the current calculated point of interest position are found to represent the coordinates of an apparent point of interest position corresponding to the true point of interest position the at least one point of interest, and if the at least one predetermined optimization parameter does not substantially exceed the at least one merit function value a choice point of interest position is updated and the step d)-h) repeated in sequence.

13. The method for corrections of metrology instruments measurements of positions of points of interests of claim 12, wherein the at least one stratified medium is a dielectric window.

14. The method for corrections of metrology instruments measurements of positions of points of interests of claim 13, wherein the dielectric window has been arranged on a vacuum chamber.

15. The method for corrections of metrology instruments measurements of positions of points of interests of claim 13, wherein the dielectric window has been arranged on a vehicle.

16. The method for corrections of metrology instruments measurements of positions of points of interests of claim 15, wherein the vehicle is chosen from a set of vehicles consisting of consisting of satellites, rockets, missiles, atmospheric vehicles, exoatmspheric vehicles, aircrafts, spacecrafts, surface vehicles, underwater vehicles, and combinations.

17. The method for corrections of metrology instruments measurements of positions of points of interests of claim 12, wherein the at least one stratified medium includes at least one solid glass retroreflectox (SGR) target.

18. The method fox corrections of metrology instruments measurements of positions of points of interests of claim 17, wherein the at least one glass retroreflector (SGR) target have been arranged in proximity to the at least one point interest.

19. The method for corrections of metrology instruments measurements of positions of points of interests of claim 12, wherein after the step e) of determination of coordinates of true position of the at least one point of interest, the steps c)-h) are repeated in succession for determination of coordinates the apparent point of interest position corresponding to the true point of interest position of at least another point of interest.

* * * * *